Oct. 16, 1951     M. J. DRACHMAN     2,571,427
DIFFERENTIAL MECHANISM
Filed Nov. 19, 1945
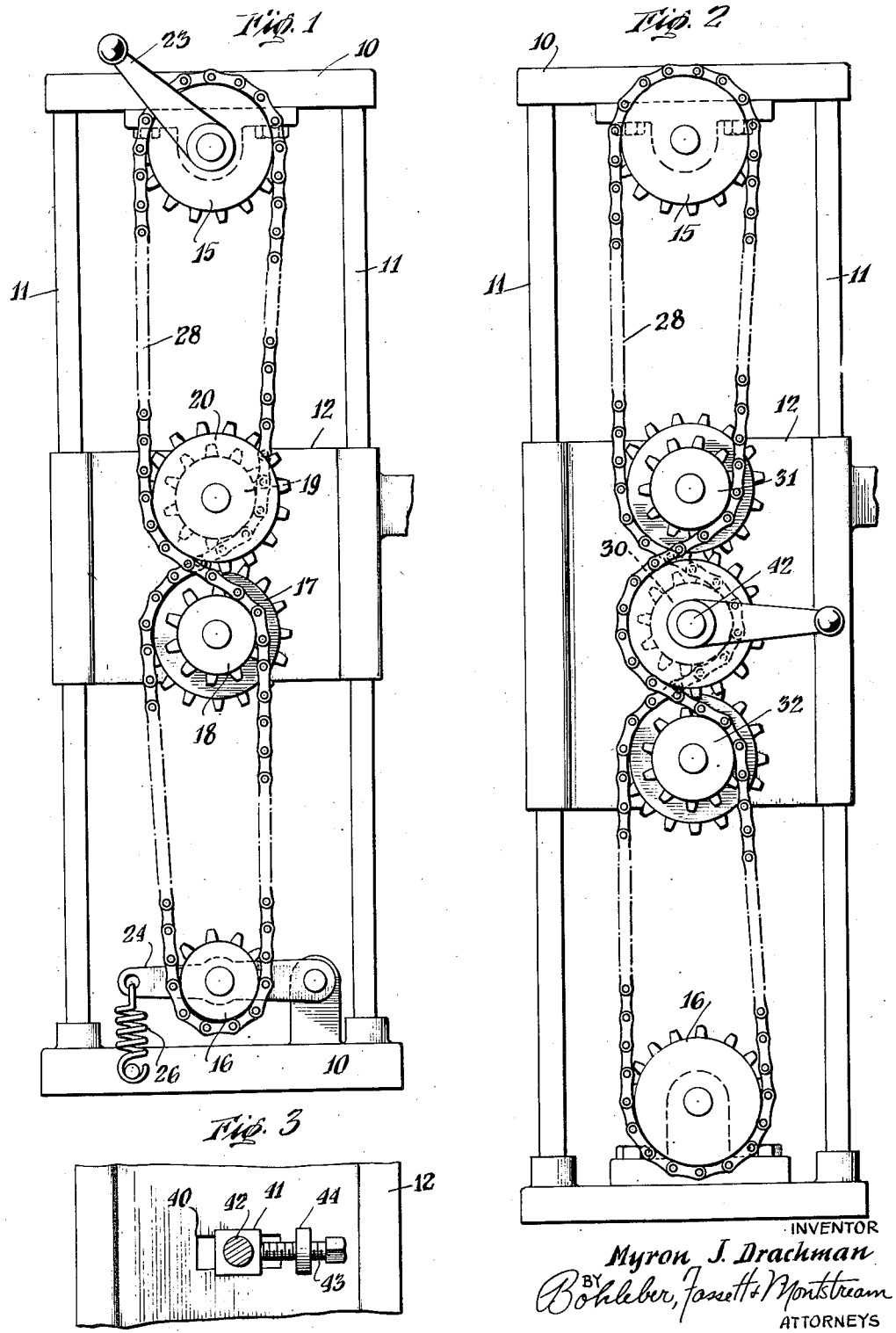
INVENTOR
*Myron J. Drachman*
BY *Bohleber, Fassett & Montstream*
ATTORNEYS

Patented Oct. 16, 1951

2,571,427

UNITED STATES PATENT OFFICE 2,571,427

DIFFERENTIAL MECHANISM

Myron J. Drachman, Bronxville, N. Y.

Application November 19, 1945, Serial No. 629,478

6 Claims. (Cl. 254—167)

This invention relates to a differential mechanism of simple construction which has general applicability for raising or lifting, such as adjusting the height of an X-ray tube for X-ray apparatus and its associated mechanism, for use in lift trucks, and many other lifting or moving devices. It is particularly suited for these purposes because it requires no locking mechanism, that is, a differential elevating mechanism is self-locking, and there is no danger of an expensive X-ray tube dropping suddenly or a load crashing because of the failure of an attendant to lock the device in elevated position. Such failures may well occur with types of lifting devices which are not self-locking.

It is an object of the invention to construct a new and novel differential mechanism in which the possibility of the cable means being cammed off of the differential wheels is substantially diminished or eliminated.

Another object of the invention is to construct a differential device in which an extensive engagement between the cable or chain means and the differential wheel means is secured.

A still further object is to construct a differential device in which a pair of sets of differential wheels is provided and the load is shifted to one set of differential wheels upon movement in one direction, and shifted to the other pair of differential wheels upon movement in the other direction.

Other objects of the invention will be more apparent from the following description taken in connection with the accompanying drawings, illustrating a preferred embodiment thereof, in which Figure 1 is a front elevation of the differential device in which a single cable cross-over means is obtained.

Figure 2 is a front elevation of a differential device having three sets of wheel means by which a double cross-over of the cable or chain means is secured.

Figure 3 is a partial view showing means for adjusting the position of the wheel means whereby the cable or chain means may be retained taut.

The differential device comprises a supporting mechanism 10 having guides or slides 11 upon which a movable mechanism 12 is mounted. It is clear that these parts may be reversed merely by anchoring the mechanism 12 whereupon the other mechanism 10 becomes a movable mechanism.

The supporting mechanism carries spaced pulleys 15 and 16. The movable mechanism is provided with differential means in the form of differential wheels 17 and 18 of different diameters which are keyed or secured together for rotation as a unit. The ratio of diameters of the differential wheels may be selected as desired. The differential wheel has recesses or teeth to assure positive drive between the cable means and the wheels.

Cross-over means is mounted adjacent to the differential wheels and in the form illustrated, the cross-over means includes cross-over wheels 19 and 20. The cross-over wheels may be of the same diameter although preferably they have a diameter in inverse ratio to the differential wheels, so that the periphery of each cross-over wheel may be brought closer to the periphery of its respective differential wheel. The cross-over wheels may be smooth surfaced wheels, that is, they need not have a positive drive connection with the cable means such as afforded by sprocket wheels although they may be so constructed if deemed advisable. The cross-over wheels rotate separately or are not connected.

Cable means 28 passes around the spaced pulleys 15 and 16 providing a strand on each side thereof. Each strand engages or circles a portion of the periphery of the cross-over wheel means 19 and 20 and then passes around a portion of the circumference of its respective differential wheel 17 or 18. Each strand is thereby carried to the other side of the differential wheel means and in so doing the cable means rides upon or engages a quarter of the circumference thereof or approximately this circumference, depending upon how close the cross-over means is mounted to the differential wheels. By the cross-over construction a large engagement of the cable means with the differential wheels is secured and also the tension in the cable means results in a component of force on the cable means forcing the same inwardly thereby substantially reducing or eliminating any tendency of the cable means to be cammed outwardly by the driving projections or sprocket teeth of the differential wheels. The cable means may be any flexible means having a positive drive, such as a chain or a cable with uniformly spaced balls or lugs.

Any one of the wheels may be rotated or the cable means may be pulled in order to move the movable mechanism with respect to the supporting mechanism. If a wheel is rotated it should preferably, be a wheel having sprocket teeth in order to assure positive movement of the cable means. In this connection a handle 23 is shown to rotate the spaced pulley 15.

Means may also be provided to keep the cable means taut, and the mechanism particularly illustrated in Figure 1 includes a lever 24, secured to the supporting mechanism upon a pivot 25. Any suitable type of pressure means may be used to propel the lever and its pulley 16 downwardly, that illustrated being a spring 26, one end of which is secured to the lever 24, and the other end is secured to the supporting mechanism.

There is illustrated in Figure 2 a construction of a differential device having three sets of wheel means. The movable and supporting mechanisms are similar to that shown in Figure 1, and will not be specifically described. The movable mechanism carries a center wheel means 30 and upon each side thereof there are mounted, adjacent to the center wheel means, a set of outboard wheel means 31 and 32. Either the center wheel means or the outboard wheel means may be differential wheels, whichever wheel means constitutes the differential wheels; one wheel is larger in diameter than the other, and the wheels preferably carry means for positive engagement between the cable means and the wheel. The differential wheels are keyed or secured together. If the center wheels constitute the differential wheel means then the outboard sets of wheels constitute cross-over means. If on the other hand, the outboard wheel means 31 and 32 provide the differential wheels then the center wheel means 30 constitutes the cross-over wheel means. The cross-over means, whether the center or the outboard means, need not be wheels, although this is the more desirable construction. The cross-over wheels may be of the same or of different diameters and if the latter their diameter may be in inverse ratio to the diameter of the differential wheels so that their periphery may be brought closely to the periphery of their respective differential wheel.

Cable means passes around the spaced pulleys 15 and 16 so that one strand thereof is on one side and the other strand is upon the other side. Each strand passes around a portion of the circumference of the wheels 31 and then passes around its respective center wheel means 30 and around a portion of the outboard wheel means 32. It will be observed that each strand crosses over to the other side of the differential means and then has a return cross-over bringing a strand back to the same side of the device. In this double cross-over construction, engagement of the cable means with the center wheel means 30 is 180° or a semi-circumference. The extent of engagement is determined by the nearness of the outboard wheel means with the center wheel means.

If the center wheel means 30 are the differential wheels then the differential wheels have a very large proportion of their circumference engaging the cable means, which is advantageous. If the outboard wheel means constitutes the differential wheel means then upon movement in one direction such as upwardly the upper set of differential wheels carries the load. Upon reverse movement the differential wheels upon the other side of the center wheel or wheels carries the load, the shift in load taking place automatically as the consequence of some necessary slack in the cable means. In this way the load put upon the differential means is divided which lengthens the life of the mechanism.

Movement of the movable mechanism may be obtained by rotating any one of the wheels or pulleys or by pulling the cable means. In the construction particularly illustrated in Figure 2 a crank is applied to the center wheel means. The cable means in this construction may be any suitable flexible means with a positive drive connection with the differential wheels, such as a chain.

In the construction of Figure 2 an effective means for maintaining the cable means taut may be provided by adjusting or varying one or both of the cross-over wheel means laterally. In the event two cross-over wheels are adjusted, one wheel is projected in one direction and the other wheel in the other direction. Any suitable means may be utilized for this purpose, that illustrated in Figure 3 including a slot 40 in the frame of the movable means in which is mounted a slidable block 41 which carries an axle 42 for the wheel means. Means may be used to propel the block within the slot, such as a screw 43 which is carried in a threaded lug 44 and engages the block 41. It is clear that spring means may be utilized in place of the screw to impel the block and wheel means laterally.

This invention provides an improvement in a differential mechanism. It is understood that various modifications in structure, as well as changes in mode of operation, assembly, and manner of use, may and often do occur to those skilled in the art; especially after benefiting from the teachings of an invention. This disclosure illustrates the preferred means of embodying the invention in useful form.

What is claimed is:

1. A differential device comprising a supporting mechanism, a movable mechanism mounted upon the supporting means, a pair of spaced pulleys carried by one of the aforesaid mechanisms, differential means including at least one pair of positive drive differential wheels connected together and having chain engaging means on the periphery thereof and mounted for rotation upon the other of said mechanisms, the differential wheels being located between the spaced wheels, cross-over means for a chain carried upon the mechanism with the differential wheels and adjacent thereto, the pair of spaced wheels and the differential wheels and the cross-over means being in vertical alignment; and a positive drive chain passing around a portion of the periphery of the spaced wheels providing a strand on each side thereof and one strand circling at least a quadrant of the periphery of one differential wheel and the other strand circling at least a quadrant of the periphery of the other differential wheel, each strand passing in opposite directions between the differential wheel and the cross-over means and engaging the cross-over means upon opposite sides thereof so that the chain pull of each strand is directed towards the center of the differential wheels overcoming the camming action tending to force the chain thereoff.

2. A differential device as in claim 1 in which the cross-over means is at least one wheel means rotatably mounted upon a shaft.

3. A differential device as in claim 1 in which the differential wheels and the cross-over means includes a center means and outboard means on opposite sides of the center means with one of the means being the differential wheel means and the other means being cross-over means, and each strand of the chain engaging one outboard means thereafter passing in opposite directions between the outboard means and the center means and around approximately a semi-circle of the center means thereafter passing in opposite directions between the center means and the other outboard means and engaging the latter.

4. A differential device comprising a supporting mechanism, a movable mechanism mounted upon the supporting mechanism, a pair of spaced pulleys carried by one of the aforesaid mechanisms, means mounted upon the other mechanism including a center wheel means and outboard wheel means adjacent the center wheel means and on opposite sides thereof, at least one of the wheel means being a pair of differential wheels of different diameter and secured together and having chain engaging means on the periphery thereof, the other wheel means providing a double cross-over for the strands of a chain, the spaced pulleys and the wheel means being in vertical alignment, and a positive drive chain passing around a portion of the periphery of the spaced pulleys providing a strand on each side thereof, each strand circling approximately a quadrant of one outboard wheel means and passing therebetween and the central wheel means in opposite directions and circling approximately a semi-circle of the center wheel means and passing between the center wheel means and the other outboad wheel means in opposite directions and circling approximately a quadrant of the latter outboard wheel means so that each strand of the chain engages around a substantial portion of the wheels of the differential wheel means to direct the chain pull towards the center thereof and overcome the camming action tending to force the chain off of the differential wheels, and one strand of the chain engaging one differential wheel and the other strand engaging the other differential wheel of a pair.

5. A differential device as in claim 4 in which the center wheel means is the differential wheels and the outboard wheel means are cross-over means.

6. A differential device as in claim 4 in which the center wheel means is a cross-over means and at least one of the outboard wheel means is a pair of differential wheels.

MYRON J. DRACHMAN.

REFERENCES CITED

The following references are of record in the file of this patent:

UNITED STATES PATENTS

| Number | Name | Date |
| --- | --- | --- |
| 283,831 | Thayer | Aug. 28, 1883 |
| 396,430 | Reichel | Jan. 22, 1899 |
| 921,646 | Larson | May 11, 1909 |

FOREIGN PATENTS

| Number | Country | Date |
| --- | --- | --- |
| 119,296 | Switzerland | Aug. 1, 1927 |